United States Patent

[11] 3,634,059

[72] Inventor  Richard C. Miller
              Toledo, Ohio
[21] Appl. No. 851,645
[22] Filed     Aug. 20, 1969
[45] Patented  Jan. 11, 1972
[73] Assignee  Libbey Owens-Ford Company
              Toledo, Ohio

[54] GLASS SHEET PRESS BENDING MOLD
     14 Claims, 5 Drawing Figs.
[52] U.S. Cl................................................. 65/273,
                                        65/275, 65/287, 65/374
[51] Int. Cl............................................... C03b 23/02
[50] Field of Search.................................... 65/273,
                                                275, 287, 374

[56]         References Cited
         UNITED STATES PATENTS
 2,395,727   2/1946   Devol.......................... 65/157
 3,332,762   7/1967   McMaster et al............. 65/273 X
 3,567,416   3/1971   Stilley et al. ................. 65/106

*Primary Examiner*—Arthur D. Kellogg
*Attorney*—Collins and Oberlin

ABSTRACT: A bending mold particularly adapted for use in a press bending apparatus. The mold disclosed herein is formed of a substantially solid block of a castable ceramic material such as vitreous silica in an hydraulic binder which has a coefficient of thermal expansion no greater than $0.45 \times 10^{-6}$ at 1,800° F. and a compressive strength of at least 3,000 lbs. per sq. in. at 2,000° F.

PATENTED JAN 11 1972

INVENTOR.
Richard C. Miller
BY
Collins & Oberlin
ATTORNEYS

GLASS SHEET PRESS BENDING MOLD

The present invention relates generally to the production of curved or bent sheets of glass and more particularly to a novel bending mold formed of a cast refractory material.

Curved or bent sheets of glass are widely used as glazing closures particularly as windows in vehicles such as automobiles and the like. When intended for such use, the sheets must be bent to rather precisely defined curvatures determined by the size and shape of the openings in which they are mounted and by the overall styling of the vehicle. One procedure for producing curved glazing closures of this type includes heating substantially flat glass sheets to an elevated temperature at which the glass softens and then pressing the softened sheets between male and female mold members having complemental shaping surfaces to conform to the desired curvature of the finished sheets.

In order to obtain maximum accuracy of curvature, while maintaining the area of contact between the mold and the glass as low as possible, it has become a general practice to construct the male mold member with a substantially solid or continuous shaping surface which contacts the entire surface of the sheet, and the female mold member with an outline or ring-type shaping surface which contacts only the marginal edge portions of the sheet.

Heretofore, little if any consideration has been given to the use of castable refractory materials as the male or solid member in a press bending apparatus. In order to obtain sufficient strength in most castables they must be prefired to a high temperature, on the order of 2,000° F. In addition to being a time-consuming procedure, such temperatures adversely affect the metal hanging and reinforcing members necessary to mount the mold in the press bending apparatus, or cause cracking of the mold due to differential expansion between the refractory and the metal. Also, most castables of sufficient strength are so heavy as to make handling of a mold of the size required for most automotive applications highly impractical.

However, since the initial introduction of vertical press bending the use of the process has greatly expanded, both in volume of given shapes and in the number of different shapes produced, particularly in the case of the production of curved automotive windows, and has arrived at a point where it has become evident that the traditional mold materials are also becoming impractical for a number of reasons.

For one, solid mold members fabricated of wood or metal are expensive to build. This has become more evident of late since there is a greater variety of shapes to be bent, requiring, naturally, a greater variety of different molds. The expense involved and the amount of labor required, which is the main factor in that expense, also means that such molds do not lend themselves well to short production runs of specialized shapes, or to experimental and development work, in which a variety of shapes may be tried before one is used for production.

Another factor is useful life. While wooden molds exhibit good stability characteristics under fluctuating temperature conditions they tend to burn and break down with extended use. While aluminum or other metal molds do not burn, they have high coefficients of thermal expansion and tend to distort under the fluctuating temperature conditions commonly encountered in the press bending process. As a result, they must be frequently reworked to maintain the accuracy of the shaping surface, and it is apparent that there is practical limit to the number of times a mold can be reworked before it is no longer feasible to use it. Another factor which must be considered with regard to metal molds is the fact that, due to expansion, the mold is a different size and shape when it is in use from when it was formed. This makes it necessary to compensate for such expansion when the mold is first fabricated. This expansion cannot be accurately predicted and compensation must be made by trial and error methods. Obviously, this is expensive and time consuming. Although such members can be cooled to minimize such factors, cooling brings on the additional problem of chill cracking the heated glass.

It has been discovered, however, that if properly reinforced and mounted there are certain castable refractory materials now available which can be used very successfully in forming solid bending molds for use in press bending, and which lend themselves very well to the expanded use of the process as discussed above.

Specifically, what this invention provides is a solid mold which is formed of a cast refractory material which is relatively light and does not require prefiring but which still has sufficient compressive strength to withstand bending pressure, which exhibits essentially no expansion up to a temperature of 2,000° F. and which can be cast to the precise curvature required with sufficient surface smoothness that no additional machining is required.

Based on the above considerations, a primary object of the invention is to provide a continuous-surface glass sheet bending mold adaptable for use in press bending which is easily formed and as a long useful life.

Another object of the invention is to provide a cast bending mold requiring no additional machining to form the shaping surface.

Another object of the invention is to provide a cast bending mold which can be completely formed at room ambient temperatures, with no prefiring required, and which will not distort at temperatures up to 2,000° F.

Other objects and advantages of the invention will become more apparent during the course of the following description when taken in connection with the accompanying drawings.

In the drawings, wherein like numerals are employed to designate like parts throughout the same:

Figure 1:
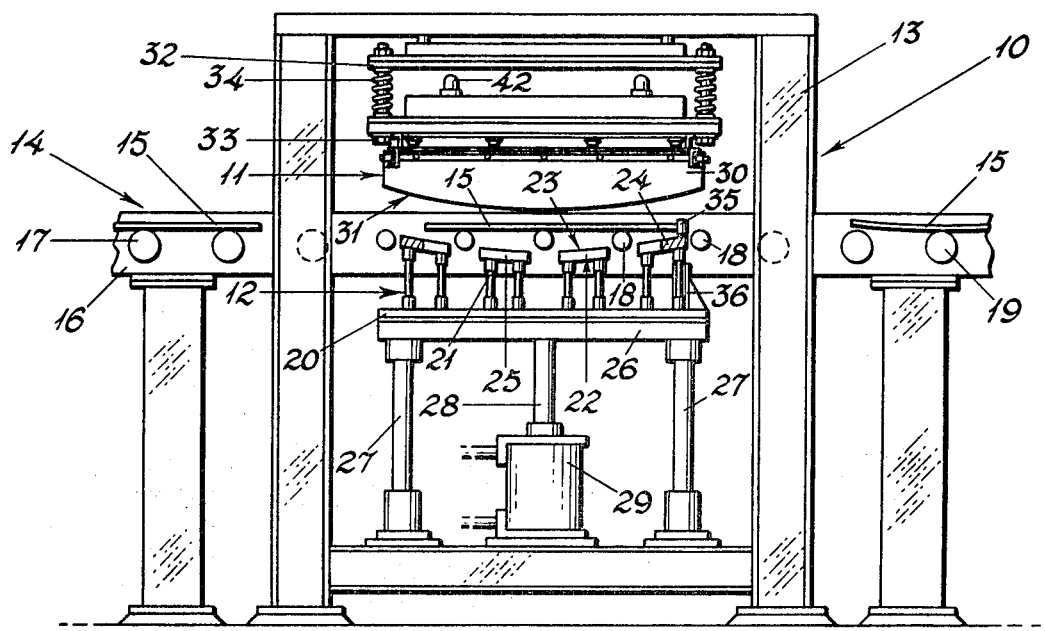
FIG. 1 is a side elevation of the typical press bending apparatus including a bending mold constructed in accordance with the invention.

Referring to the drawings, FIG. 1 illustrates the novel bending mold of the present invention as it is installed in a horizontal press bending apparatus. The bending apparatus, indicated generally by the numeral 10, consists essentially of a substantially stationary upper male mold member 11 and a movable lower female mold member 12, suitably mounted within a rigid framework 13. A conveyor system, designated by the numeral 14, supports the glass sheets 15 as they are transferred from a heating area (not shown), through the bending apparatus 10, and then to a heat-treating area (not shown) for annealing or tempering. The conveyor system 14 comprises supporting rails 16, running along either side of the bending apparatus 10, entry conveyor rolls 17 bringing the sheets into the bending apparatus, supporting rolls 18 within the bending apparatus, and exit rolls 19 for transferring the bent sheets out of the bending apparatus.

The female mold member 12 is generally of outline or ring-type construction and comprises a base member 20, a plurality of supports 21 upstanding from said base member, and a shaping element, indicated by the numeral 22, which is fixed to the tops of the supports 21. The shaping element 22 conforms in outline to that of the glass sheet 15 to be bent, and a shaping surface 23 conforming to the desired curvature of the sheet is formed thereon. In the illustrative embodiment the female mold member 12 is vertically movable to lift a glass sheet from the conveyor rolls 18 into pressing engagement with the male mold member 11, and in order to provide clearance for the rolls the shaping element 22 is made up of a plurality of sections including transversely disposed end sections 24 and longitudinally spaced bar portions or segments 25, between which the conveyor rolls are located.

The base member 20 of the female mold member 12 is mounted on a carriage 26, supported by guide members 27 which allow vertical movement only, said vertical movement being provided by the ram 28, of an air cylinder 29, which bears against the carriage.

The substantially stationary male mold member 11 comprises a cuplike shaping element 30 provided with a continuous shaping surface 31 conforming to the desired curvature of the bent sheet. The mold member 11 is resiliently supported from a mounting frame 32, which depends from a crossbar of the main frame 13, by bolts 33. Springs 34 surround each bolt and space the mold member from the mounting frame 32, acting as cushions to prevent excessive pressure from being exerted on the glass sheet by the female mold member 12 as it moves upward into pressing engagement with the male mold member.

Glass sheets 15, heated to substantially the softening point, are transferred from a furnace (not shown) into the bending apparatus by the entry rolls 17 and are received in position to be bent on the supporting rolls 18. As each sheet arrives between the mold members it is halted by engagement of its leading edge with locator stops 35 (one of two shown) which are moved into and out of the path of sheet movement by an air cylinder 36 mounted on the base member 20. As the sheet enters the bending apparatus, a photocell or other suitable detection device initiates a bending cycle in which the sheet is stopped between the mold members 11 and 12 by the stops 35, after which the air cylinder 29 causes the lower mold member 12 to move upward, lifting the glass sheet 15 into pressing engagement with the upper mold member 11. As each sheet 15 is lifted from the rolls 18 the stops 35 are lowered to a point below the level of the top surfaces of the rolls 18 so that after the glass sheet has been pressed between the mold members and returned to the rolls 18 by the lower mold member 12, it is free to be immediately transferred from the bending apparatus onto the exit conveyor rolls 19.

Figure 2:
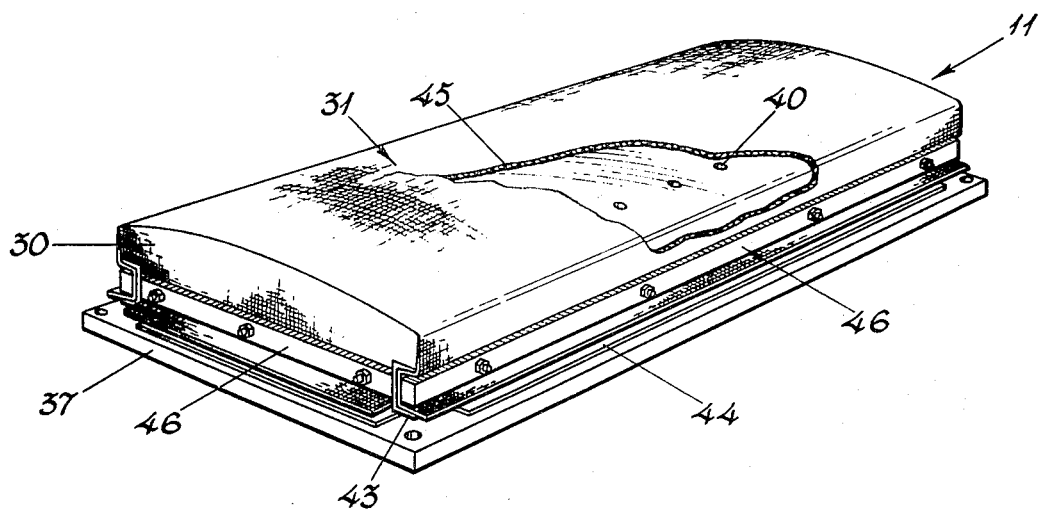
FIG. 2 is a perspective view of a bending mold constructed in accordance with the invention.
Figure 3:
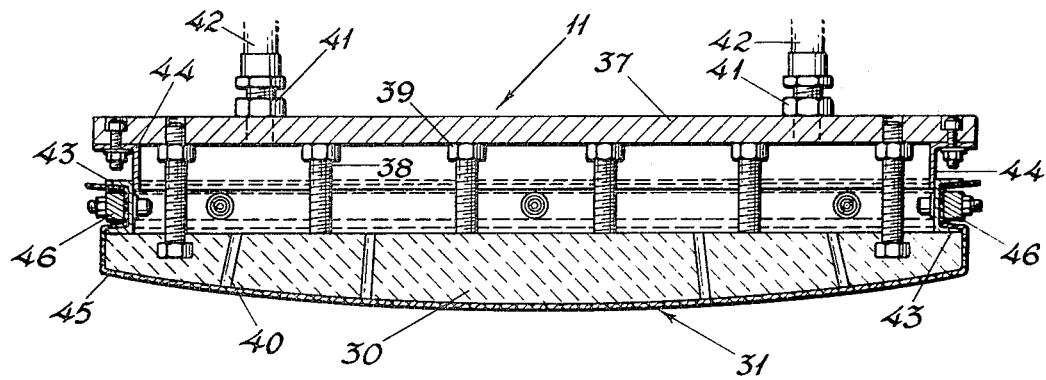
FIG. 3 is a transverse sectional view of the mold shown in FIG. 2.

It can be appreciated from the foregoing discussion that the upper, or male mold member 11 is subjected to fluctuating temperature conditions as it is intermittently contacted by a heat-softened glass sheet in the bending process. Referring particularly to FIGS. 2 and 3, the present invention provides a solid, or continuous bending mold 11 having a shaping element 30 which is cast from a material which exhibits virtually no expansion with increasing temperature.

Specifically, it has been found that a cast refractory material having a coefficient of thermal expansion no greater than $0.45 \times 10^{-6}$ up to around 1,800° F. with a compressive strength of at least 3,000 lbs. per sq. in. at 2,000° F. is well suited to this application. A good example of such a material is vitreous silica in an hydraulic binder such as calcium aluminate, commercially available from Harbison-Walker Refractories Co., and designated as H-W 13-65 Castable. This material exhibits the following properties:

| | |
|---|---|
| Bulk Density after Drying at 230° F. (lb./cu.ft.) | 118 |
| Modulus of Rupture (lbs./sq.in.) | |
| After Drying at 230° F. | 1,020 |
| After Heating at 1,000° F. | 410 |
| After Heating at 1,500° F. | 250 |
| After Heating at 2,000° F. | 240 |
| After Heating at 2,300° F. | 300 |
| Cold Crushing strength (lbs./sq./in.) | |
| After Drying at 230° F. | 8,350 |
| After Heating at 1,000° F. | 5,100 |
| After Heating at 1,500° F. | 4,550 |
| After Heating at 2,000° F. | 3,160 |
| After Heating at 2,300° F. | 2,220 |
| Linear Change (%) | |
| After Drying at 230° F. | 0.0% |
| After Heating at 1,000° F. | 0.0% |
| After Heating at 1,500° F. | 0.0 % |
| After Heating at 2,000° F. | 0.0% |
| After Heating at 2,300° F. | 0.01 to +0.4 |

Another material comprising fused silica in an hydraulic binder which has proved to be highly effective is "Silfrax" Castable, a product of the Carborundum Company which exhibits the following properties:

| | |
|---|---|
| Bulk Density (lbs./ft.³) | 115–120 |
| Thermal Expansion | $0.45 \times 10^{-6}$ From 0°–1,832° F. |
| Modulus of Rupture—Cold | 1,200–1,800 p.s.i. |
| Compressive Strength | 4,000–6,000 p.s.i. |
| Maximum Operating Temperature | 2,050°–3,000° F. |

Of particular interest in using such materials in glass press bending is their negligible thermal expansion. By way of comparison, aluminum and cast iron, which are often used for such molds have a coefficient of expansion on the order of $25.0 \times 10^{-7}/°C$. and $10.0 \times 10^{-6}/°C$. respectively. Other desirable features are low heat conductivity, good heat shock resistance and sufficient strength without prefiring to enable the mold to withstand the forces applied in a press bending process. Also, these properties enable the mold to be used without external cooling, thereby eliminating the chill cracking problem.

Construction of the mold is straightforward and relatively simple, requiring only a plaster of Paris form and some means of mounting the cast mold in the bending apparatus.

As illustrated in FIG. 2 and 3 the mold assembly 11 comprises a baseplate 37 which bolts to the mounting frame 32 of the bending apparatus, the cast shaping element 30, and a plurality of bolts 38 which depend with their heads down from the baseplate 37 to anchor the cast shaping element. The bolts are threaded into the plate 37 and are locked in place by locknuts 39 which bear against the underside of the plate.

To form the cast mold member, the plate 37, with the bolts attached, is suspended over the plaster mold in a position in which the boltheads will be completely covered by casting material. The castable refractory material is then poured in the mold and allowed to set. In order to insure that the mold member will release from the glass when it is in operation, a plurality of airholes 40 can be formed in the shaping element either during molding or by drilling afterward.

In order to make full use of the airholes 40 the mold member can be enclosed after setting and air inlet connections 41, are provided in the plate for that purpose. Air can then be applied both during bending to provide a cushion of air between the shaping surface 31 and the glass, and after bending to release the bent sheet from the mold. Air is supplied through air lines 42 (FIGS. 1, 3) from a suitable source (not shown). As illustrated in FIGS. 2 and 3 the mold member is enclosed by channel members 43 which are welded or otherwise fastened to angle members 44 bolted to the baseplate 37.

To provide a nonabrasive surface in contact with the glass and to provide additional insulation, the shaping surface 31 is covered with a sheet of insulating cloth 45, such as woven or knit fiber glass. According to the illustrative embodiment the cloth is stretched over the shaping surface and held in place by retainer bars 46 which are bolted to the channel members 43. The cloth is sufficiently porous that the air flowing through the holes 40 is not significantly restricted.

Figure 4:
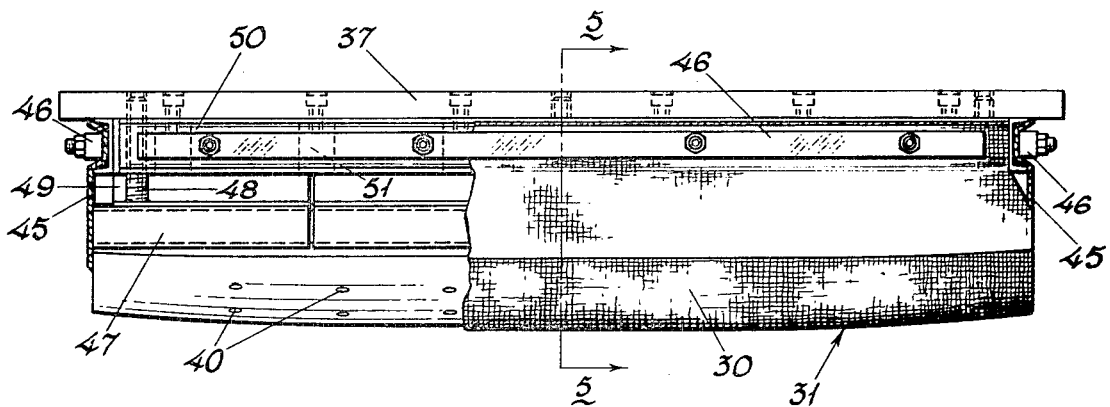
FIG. 4 is a longitudinal elevation view with part of the cover cut away of the modified form of the invention.
Figure 5:
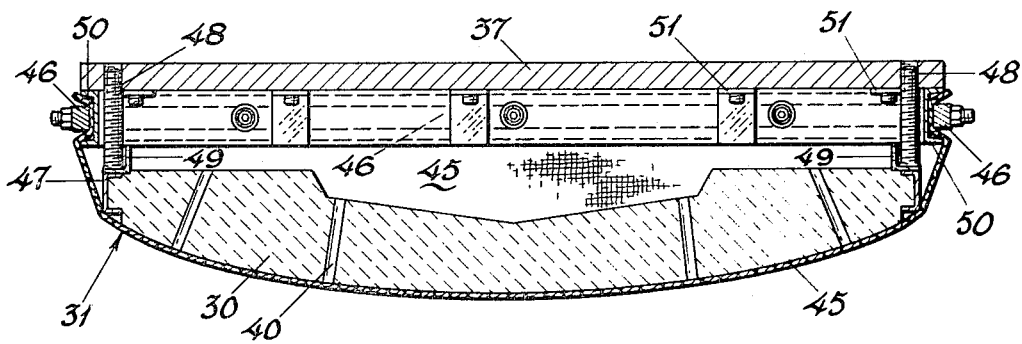
FIG. 5 is a sectional view taken along line 5—5 of FIG. 4.

FIGS. 4 and 5 illustrate a modified embodiment which is generally similar in construction to that shown in FIGS. 2 and 3 except for the manner in which the cast shaping element 30 is anchored to the base plate 37. In this embodiment the shaping element 30 is anchored by channel members 47 running along the opposed longitudinal edges of the element. The channels 47 are fastened to the baseplate 37 by studs 48. The studs are screwed into place in the baseplate 37 then welded first to an elongated angle member 49 and then to the channel member 47. The angle member serves to help enclose the mold when cushioning a releasing air is used. The mold is further enclosed by channel members 50 which are held in place by a plurality of angle brackets 51 fastened to the channel and to the baseplate 37. Holes 40 are formed through the shaping element and an insulating cloth cover is provided, as above.

I claim:

1. In apparatus for bending glass sheets comprising means for heating the sheet to the softening point, first and second mold members having complemental shaping surfaces formed thereon, means for supporting a heat-softened sheet between said shaping surfaces, and means for moving said mold members relatively forward one another to press the sheet between the shaping surfaces; the improvement consisting in that at least one of said mold members comprises a substantially flat mounting plate, a plurality of anchor pins depending from said plate and having heads formed at their free ends, and a substantially solid block of a refractory material cast around said anchor pins with said heads imbedded in said cast refractory material, said refractory material having a coefficient of thermal expansion no greater than $0.45 \times 10^{-6}$ from 0° to 1,832° F.

2. Apparatus for bending glass sheets as claimed in claim 1, including panel members extending between the edges of said mounting plate and the sides of said cast refractory block to enclose the space between said mounting plate and said block to form a sealed air chamber, a plurality of holes formed through said cast refractory block for the passage of air from said chamber through said shaping surface, and means connecting said chamber to a source of pressurized air.

3. Apparatus for bending glass sheets as claimed in claim 2, including a layer of a porous, nonabrasive insulating material over said shaping surface.

4. In apparatus for bending glass sheets comprising means for heating a sheet to the softening point, first and second mold members having complemental shaping surfaces formed thereon, means for supporting a heat-softened sheet between said shaping surfaces, and means for moving said mold members relatively toward one another to press the sheet between said shaping surfaces; the improvement consisting in that at least one of said members comprises a substantially solid block of a cast refractory material having a coefficient of thermal expansion no greater than $0.45 \times 10^{-6}$ from 0° to 1,832° F., the shaping surface of said cast refractory block being covered by a layer of nonabrasive insulating material.

5. Apparatus for bending glass sheets as claimed in claim 4, in which said refractory material has a compressive strength of at least 3,160 lbs. per sq. in. at 2,000° F.

6. Apparatus for bending glass sheets as claimed in claim 4, in which said cast refractory material comprises vitreous silica in a hydraulic binder.

7. Apparatus for bending glass sheets as claimed in claim 4, in which said cast refractory material comprises vitreous silica in a calcium aluminate binder.

8. In apparatus for bending glass sheets comprising means for heating a sheet to the softening point, first and second mold members having complemental shaping surfaces formed thereon, means for supporting a heat-softened sheet between said shaping surfaces, and means for moving said mold members relatively toward one another to press the sheet between said shaping surfaces; the improvement consisting in that at least one of said members comprises a substantially solid block of a cast refractory material having a coefficient of thermal expansion no greater than $0.45 \times 10^{-6}$ from 0° to 1,832° F., the formation of said block having consisted essentially of pouring the castable refractory material into a mold shaped to the desired curvature and allowing it to set in its final useable form, and a plurality of discrete holes formed through said block for the passage of pressurized gas through said shaping surface.

9. In apparatus for bending glass sheets, comprising means for heating a sheet to the softening point, first and second mold members having complemental shaping surfaces formed thereon, means for supporting a heat softened sheet between said shaping surfaces, and means for moving said mold members relatively toward one another to press the sheet between said shaping surfaces, the improvement residing in that at least one of said mold members comprises a mounting plate, anchoring pins affixed to said mounting plate and projecting outwardly therefrom, and a substantially solid block of a refractory material cast integrally with said mounting plate with said anchoring pins at least partially imbedded therein, the outer surface of said block of refractory material comprising one of said shaping surfaces.

10. Apparatus for bending glass sheets as claimed in claim 9, including an enclosed chamber between said mounting plate and the rear surface of said block of refractory material.

11. Apparatus for bending glass sheets as claimed in claim 10, including at least one opening extending through said block providing communication between said shaping surface thereof and said enclosed chamber.

12. Apparatus for bending glass sheets as claimed in claim 11, including means supplying gas under pressure to said enclosed chamber whereby a cushion of said gas is provided between said shaping surface and a glass sheet bent thereon.

13. Apparatus for bending glass sheets as claimed in claim 9, wherein said block of refractory material has a coefficient of thermal expansion no greater than $0.45 \times 10^{-6}$ in the temperature range from 0° to 1,832° F.

14. Apparatus for bending glass sheets as claimed in claim 9, wherein said block of refractory material has a thermal expansion of substantially 0.0° up to 2,000° F.

* * * * *